Figure 1:
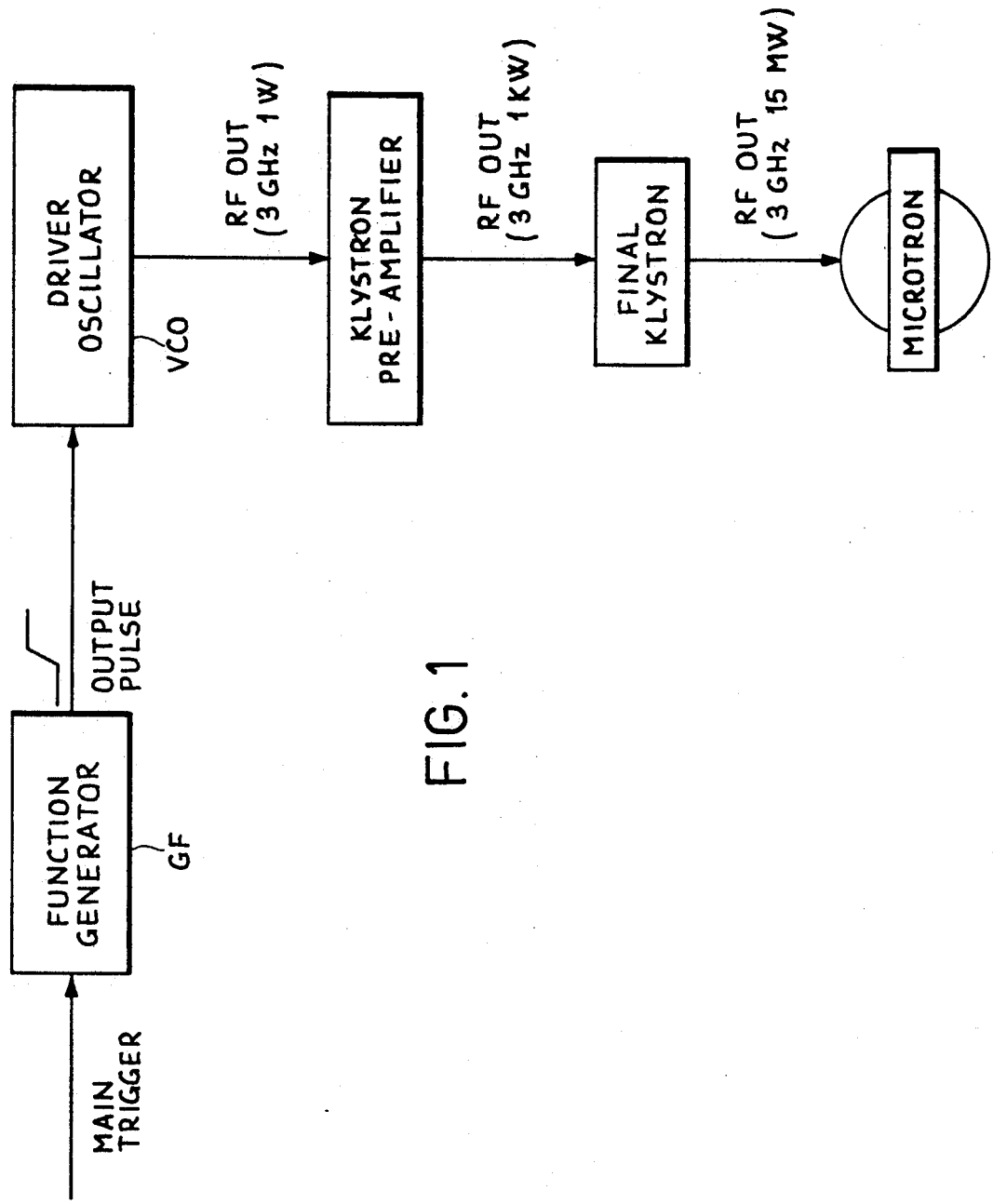

United States Patent [19]
Sabia et al.

[11] Patent Number: 5,247,526
[45] Date of Patent: Sep. 21, 1993

[54] RADIO FREQUENCY GAIN FOLLOWER, IN PARTICULAR FOR A FREE ELECTRON LASER

[75] Inventors: Elio Sabia, Ariccia; Pantaleo Raimondi, Grottaferrata, both of Italy

[73] Assignee: Ente per le Nouve Tecnologie l'Energia e l'Ambiente, Rome, Italy

[21] Appl. No.: 798,245

[22] Filed: Nov. 12, 1991

[30] Foreign Application Priority Data

Nov. 16, 1990 [IT] Italy ............................ 48486 A/90

[51] Int. Cl.$^5$ ................................................ H01S 3/00
[52] U.S. Cl. .......................................... 372/2; 372/69
[58] Field of Search ............................ 372/2, 69, 92

[56] References Cited

U.S. PATENT DOCUMENTS

| | | | |
|---|---|---|---|
| 4,189,686 | 2/1980 | Brau et al. | 372/2 |
| 4,287,488 | 9/1981 | Brau et al. | 372/2 |
| 5,095,486 | 3/1992 | Etievant | 372/2 |

Primary Examiner—Leon Scott, Jr.
Attorney, Agent, or Firm—Beveridge, DeGrandi, Weilacher & Young

[57] ABSTRACT

The object of the invention is a radio frequency gain follower, in particular for free electron lasers, wherein the equivalent of a variation of the length of the optical cavity is achieved by means of a variation of the time frequency of the packets of electrons that are supplied to the laser by an accelerator machine, in particular a microtron, characterized in that said microtron is driven, through a one or more stage amplifier section, by a frequency generator in turn driven by a function generator.

5 Claims, 1 Drawing Sheet

RADIO FREQUENCY GAIN FOLLOWER, IN PARTICULAR FOR A FREE ELECTRON LASER

The present invention will be disclosed generally with reference to free electron lasers and is concerned particularly with a device performing the function of increasing the efficiency of a free electron laser that utilizes a radio frequency accelerator machine.

As is known, beside traditional lasers, free electron lasers have been developed, named the FEL's (acronym of the English expression Free Electron Laser). A peculiar characteristic of FEL's, in comparison with conventional laser sources, is that the optical medium, instead of being comprised of an ensemble of atoms or molecules, is nothing but a high energy electron beam that propagates through a magnetic structure named the "ondulator". For the rest, their operation, as a matter of principle, does not stray from the operation of traditional lasers.

Considering that two very important parameters in the operation of any laser and therefore of a free electron laser also are the power output and the gain, contrivances have already been realized, such as the tapered ondulator may be, tending to improve its performance. However, the results have been very poor in the FEL's operating under a low gain condition.

In a free electron laser that operates with a non continuous electron beam and therefore with electron "packets" or "bunchs" and corresponding "packets" or "bunchs" of photons, the main problem is to maintain the synchronism of the superposition of the packets of electrons with the packets of photons, whereamong the interaction has to take place.

A well-known aspect is that the optimum value of the length d of the resonant cavity that maximizes the power output of the laser does not coincide with the one that maximizes the gain of the same. It is therefore desirable a mechanism that, during the increase of the laser signal, i.e. under a condition in which there is an increase of the power output accompanied by a gain decrease, allows the length of the resonant cavity to be changed in such a manner as to maintain the gain of the peak value always. From considerations of a theoretical order one deduces that a mechanism of such a kind can increase the efficiency of a free electron laser even by one order of magnitude. The length variations that are of interest to this end are of some tens of microns in times of the order of some microseconds. The realization of a mechanism for practically implementing such a length variation has proven anyhow extremely complex.

The general object of the present invention is to realize a device for maximizing the efficiency of a free electron laser, that does not present the difficulties and the complexity of a device based upon the variation of the length of the resonant cavity of the laser, though it has the same effect as the latter.

The present invention is based upon the consideration that, by acting upon other, more easily modifiable parameters of the laser, instead of upon the length of its resonant cavity, it is possible to achieve effects equivalent to those of a variations of such a length.

Upon the basis of this consideration, the precedently indicated general object is achieved by means of a device named the radio frequency gain follower, that allows the succession frequency, that is to say the time distance of the subsequent electron packets, to be varied.

It is therefore the specific object of the present invention a radio frequency gain follower in particular for free electron lasers, wherein the equivalent of a variation of the length of the optical cavity is achieved by means of a variation of the time frequency of the electron packets that are supplied to the laser by an accelerator machine, in particular a microtron, characterized in that said microtron is driven, through a two or more stage amplifier section, by a frequency generator in turn driven by a function generator.

In the preferred embodiment, the frequency generator is a voltage controlled oscillator and is driven by a function generator the output signal whereof is a voltage having a behaviour corresponding to the frequency variation that one desires to achieve.

Again in the preferred embodiment, the power amplifier section comprises a first preamplifier Klystron and an end second amplifier Klystron.

Further particularities and advantages of the present invention will turn out to be apparent from the continuation of the disclosure with reference to the annexed drawing, given only as a matter of example and not of restriction, wherein the preferred embodiment is shown.

Before passing to a detailed disclosure of the device shown in the drawing, an outline of the theory upon which the device at hand is based will be given.

The "round-trip" period of the photons in the optical resonator of a free electron laser has to be synchronized with the repetition time of the packets of electrons. In other words, the length of the resonator, defined by the distance d between the mirrors, and the radio frequency $\nu_{RF}$ of the accelerator have to be bound by the relation:

$$2d = (nc)/\nu_{RF}$$

wherein c is the velocity of light in vacuo and n is an integer.

Putting L=2d, it results that the variation $\delta L$ is related to the variation of frequency $\delta\nu_{RF}$ by $$\delta L = -(nc/\nu_{RF}^2)\delta\nu_{RF}$$

For instance, with $\delta\nu = 5$ kHz and $\nu_{RF} = 3$ GHz, and equivalent length variation $\delta L = 21$ μm is obtained.

A device based upon this principle can be operated in a frequency variation range $$1 \text{ kHz} \leq \delta\nu_{RF} \leq 10 \text{ kHz}$$

in times comprised between 0,1 microseconds and 20 microseconds.

A device based upon a variation of the frequency of the packets, however, turns out to be equivalent to a device based upon a variation of the length of the optical cavity, provided the characteristics of the beam of electrons are not sensibly affected.

The variation of the radio frequency in the macro pulse causes three undesired effects:

i) a power variation in the machine that originates the beams of electrons, such as a microtron;
ii) a variation of the energy of the beam of electrons;
iii) a variation of the synchronous phase.

Let us go to estimate the incidence of these undesired consequences.

As regards the variation of power in the microtron, it can be observed that, the Q of the cavity of the microtron being of the order of $10^4$, it results:

$$\Delta\nu_{RF}/\nu_{RF} << 1/Q$$

whereby the relative power variation $\Delta P/P$ can be approximated by:

$$\Delta P/P \simeq Q^2(\Delta\nu_{RF}/\nu_{RF})^2$$

which, at the maximum, turns out to be (for $\delta\nu_{RF}=10$ kHz):

$$\Delta P/P \simeq 10^{-3}$$

and therefore the effect upon the beam of electrons can be considered to be negligible.

As regards the variation of energy of the beam of electrons, $$\Delta E/E = \Delta\nu_{RF}/\nu_{RF}$$

holds, whereby the relative energy variation turns out to be at the maximum:

$$\Delta E/E = 3 \times 10^{-6}$$

and therefore is completely negligible.

Finally, as regards the variation of the synchronous phase, considering that the phase difference of electrons in travelling n orbits is given by:

$$\Delta\phi = \chi[n(n+1)/(2\nu_{RF})]^2$$

wherein $\chi$ represents the frequency variation in time unity, one typically has ($\delta\nu_{RF}=6$ kHz in 2 microseconds):

$$\Delta\phi = 10^{-3} \text{ degrees}$$

and the effect is negligible in this case also.

Having so proved the feasibility and the theoretical convenience of such a device, a practice embodiment thereof will be now disclosed, with reference to the Figure.

The free electron laser, as well as other electron devices, utilize accelerator machines as the microtron is. As the gain follower device for a free electron laser according to the present invention has to operate a time frequency variation of the packets of electrons, such a device has to operate at the level of the control of the microtron that provides said electron packets.

As is seen in the figure, the device, in a block schematic form, comprises a function generator FG the output pulse whereof is a voltage the form whereof corresponds with the variation of frequency that one desires to obtain. Such an output pulse is applied to a driving oscillator VCO (voltage controlled oscillator) that generates an output frequency determined by the input voltage.

The output frequency of the oscillator VCO, for instance a 3 GHz, 1 W radio frequency is amplified in a Klystron preamplifier stage, e.g. up to 1 kW and then in an again Klystron end amplifier stage, that brings it up to 15 MW, e.g.

The output frequency from the end Klystron is applied to the microtron for the drive of the free electron laser in the desired and precedently described way.

In the above the preferred embodiment of the present invention has been disclosed, but it is to be understood that those skilled in the art will be able to make modifications and variations thereto, without so getting out of the scope of protection of the present invention.

We claim:

1. A radio frequency gain follower for a free electron laser, comprising:
   a function generator for supplying an voltage waveform;
   a frequency generator driven by said function generator for supplying an output frequency signal determined by said voltage waveform; and
   a microtron electron beam accelerator driven by said frequency generator, for supplying electron packets to a free electron laser at a frequency based upon said output frequency signal;
   said voltage waveform corresponding to a frequency variation of said electron packets such that a frequency of said electron packets is varied to control synchronism between supplied electron packets and photons of a free electron laser, thereby achieving the effect of a variation in length of an optical cavity of a free electron laser.

2. A radio frequency gain follow for a free electron laser according to claim 1, wherein said frequency generator includes a voltage controlled oscillator.

3. A radio frequency gain follow for a free electron laser according to claim 2, wherein said function generator supplies a voltage waveform to said voltage controlled oscillator such that an output frequency signal of said voltage controlled oscillator maintains a gain of a free electron laser a at a peak value.

4. A radio frequency gain follow for a free electron laser according to claim 1, further including an amplifier, having at least one stage, interposed between said frequency generator and said microtron for amplifying said output frequency signal.

5. A radio frequency gain follow for a free electron laser according to claim 4, wherein said amplifier includes a Klystron preamplifier stage and a Klystron final amplifier stage.

* * * * *